United States Patent
Derflinger et al.

[11] Patent Number: 5,843,484
[45] Date of Patent: Dec. 1, 1998

[54] FORM TOOL FOR COMPRESSION FORMING A MOLDED BODY FROM A SINTERED POWDER

[75] Inventors: Karl Derflinger, Laakirchen; Johann Dickinger, Bad Wimsbach, both of Austria

[73] Assignee: Miba Sintermetall Aktien-gesellschaft, Laakirchen, Austria

[21] Appl. No.: 879,294

[22] Filed: Jun. 19, 1997

[30] Foreign Application Priority Data

Jun. 20, 1996 [AT] Austria ..................... 1089/96

[51] Int. Cl.$^6$ ........................................ B22F 5/08
[52] U.S. Cl. .................. 425/78; 425/193; 425/411; 425/414; 425/422; 425/444; 425/468
[58] Field of Search .............. 425/78, 193, 394, 425/398, 403, 414, 411, 422, 444, 436 RM, 436 R, 468, DIG. 10; 249/59

[56] References Cited

U.S. PATENT DOCUMENTS

| | | |
|---|---|---|
| 3,909,167 | 9/1975 | Signora . |
| 4,853,180 | 8/1989 | Howard ..................... 425/78 |
| 5,037,287 | 8/1991 | Hirai ........................ 425/78 |
| 5,043,123 | 8/1991 | Gormanns et al. ........ 425/78 |
| 5,259,744 | 11/1993 | Take ......................... 425/78 |
| 5,558,887 | 9/1996 | Skufca et al. ............. 249/59 |
| 5,631,029 | 5/1997 | Bewlay et al. ............ 425/78 |

FOREIGN PATENT DOCUMENTS

| | | |
|---|---|---|
| 0 528 761 | 2/1993 | European Pat. Off. . |
| 25 08 065 | 9/1976 | Germany . |
| WO96/04087 | 2/1996 | WIPO . |

*Primary Examiner*—Khanh P. Nguyen
*Attorney, Agent, or Firm*—Collard & Roe, P.C.

[57] ABSTRACT

There is described a form tool for compression forming a molded body having a circular cylindrical through hole with at least one helical groove from a sintering powder, which form tool has a mantle (1) with an inserted mold core (2), which forms at least one flight (3) protruding against the mantle (1) for forming the groove of the molded body, and a ring-shaped plunger (6) engaging in the mold cavity (5) between the mantle (1) and the mold core (2). To create advantageous constructional conditions, it is proposed that the axial length of the flight (3) of the mold core (2) should correspond to the axial length of the molded body, and that the mold core (2) should have an axial web (4) continuing the flight (3), which axial web engages in an adapted axial groove of the ring-shaped plunger (6).

3 Claims, 2 Drawing Sheets

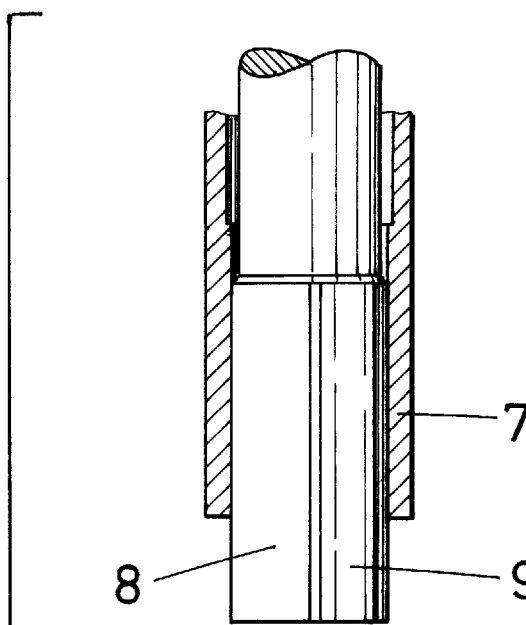
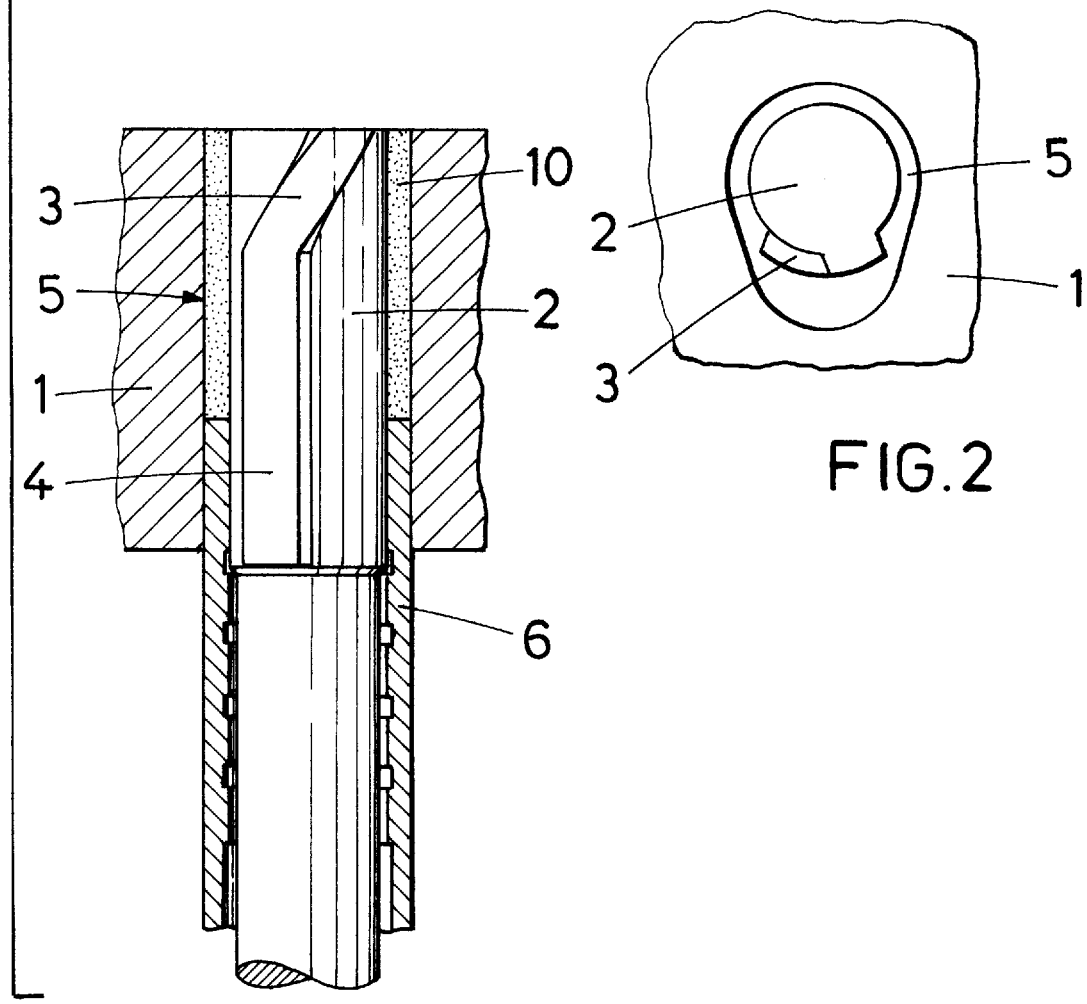

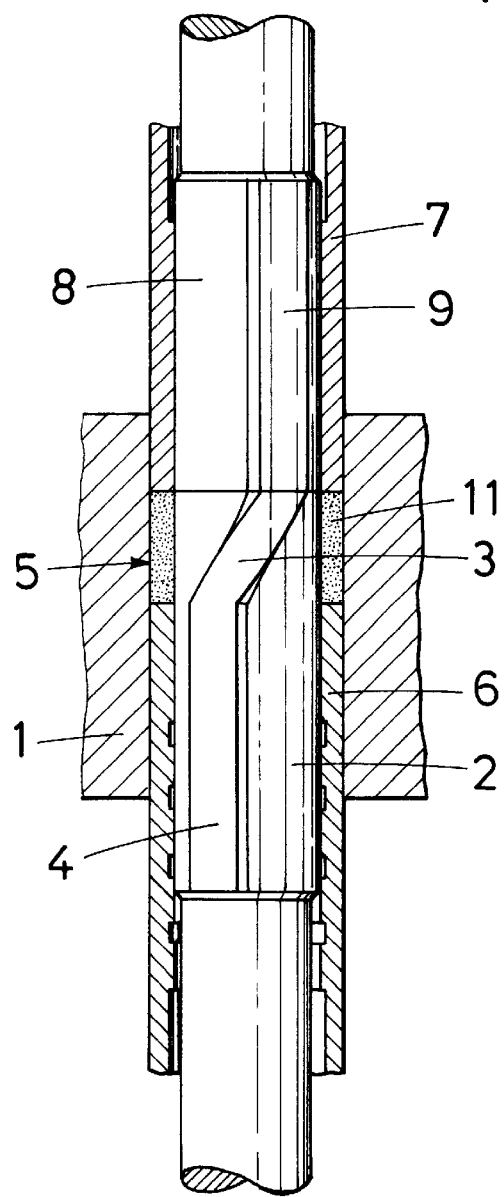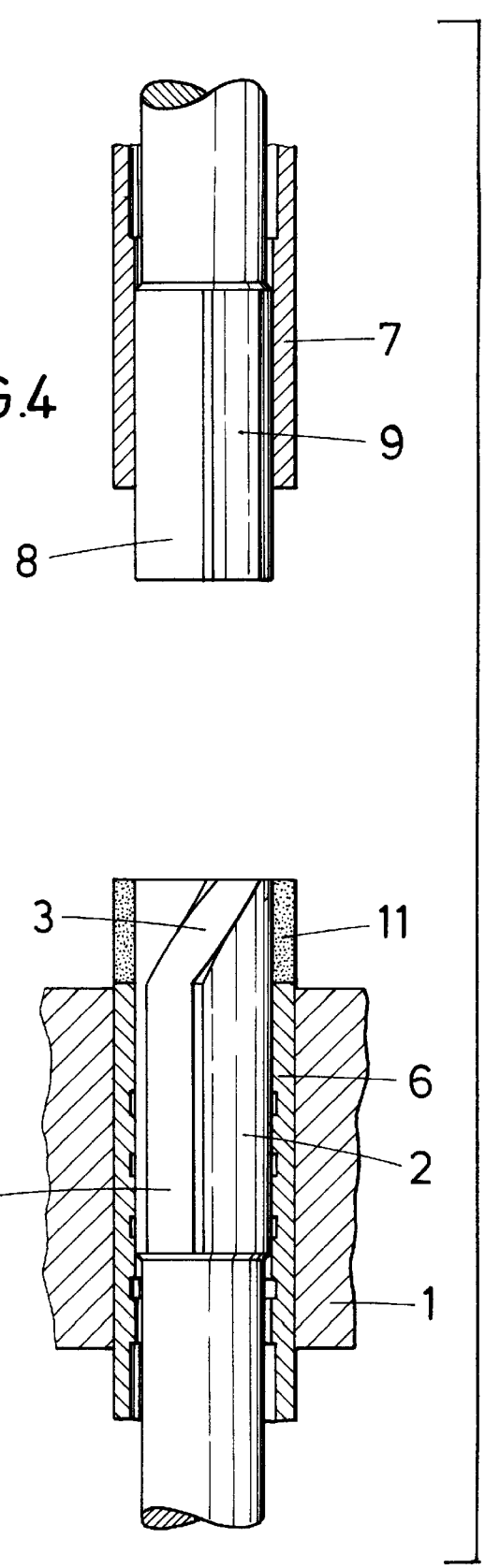

FORM TOOL FOR COMPRESSION FORMING A MOLDED BODY FROM A SINTERED POWDER

BACKGROUND OF THE INVENTION

1. Field of the Invention

This invention relates to a form tool for pressing a molded body having a circular cylindrical through hole with at least one helical groove from a sintering powder, comprising a mantle with an inserted mold core, which forms at least one flight protruding against the mantle for forming the groove of the molded body, and comprising a ring-shaped plunger engaging in the mold cavity between mantle and mold core.

2. Description of the Prior Art

For forming one or several helical grooves in a circular cylindrical through hole of a molded body pressed from a sintering powder there is required a form tool with a mold core, which forms a flight corresponding to the groove to be formed and protruding against the mantle. In known form tools, the ring-shaped plunger used for compacting the sintering powder filled into the mold cavity between the mantle and the mold core must adjustably be guided on the flight of the mold core for axially compacting the sintering powder under a relative rotation of the plunger with respect to the mold core. This requires an additional rotary adjustment of the mold core, when a contour of the molded body different from the circular cylindrical shape must be expected. Since usual molding presses are merely designed for axial adjusting movements, such form tools cannot be inserted in conventional adapters of the molding presses. There must rather be used adapters with additional rotary actuators.

SUMMARY OF THE INVENTION

It is therefore the object underlying the invention to eliminate these deficiencies and improve a form tool as described above such that its use is also possible in molding presses with conventional adapters, which can merely perform axial adjusting movements.

This object is solved by the invention in that the axial length of the flight of the mold core corresponds to the axial length of the molded body, and that the mold core has an axial web continuing the flight, which engages in an adapted axial groove of the ring-shaped plunger.

Due to the restriction of the axial length of the flight of the mold core to the axial length of the molded body to be pressed, it is possible in connection with the axial web continuing the flight to compact the sintering powder filled into the mold cavity by means of an exclusively axial adjusting movement of the ring-shaped plunger to form a molded body, when the plunger constituting the one endface closure of the mold cavity is axially moved along the mold core, until the plunger adjoins the flight. For removing the molded body from the mold, the same is released from the mantle by a relative axial movement of the mantle with respect to the mold core, so as to be lifted from the mold core in a screw movement by means of a rotatable gripper.

The closure of the mold cavity opposite the plunger can easily be formed by a corresponding mold bottom. More favorable molding conditions are achieved, however, when in accordance with a further embodiment of the invention there are provided two ring-shaped plungers engaging in the mold cavity from opposite sides, one of which plungers is movably guided with respect to a core extension to be axially set against the mold core, which core extension likewise has an axial web engaging in an axial groove of the associated plunger and continuing the flight of the mold core, and when the core extension is movable with respect to the plunger associated to the mold core by entraining the mold core. When merely one plunger cooperates with a mold bottom, nonuniform compactions of the sintering powder may occur as a result of the undercuts produced by the flight with respect to the axial adjusting direction of the plunger. When using two plungers acting against each other, this disadvantage can be eliminated, because on both sides of the flight corresponding compaction condition can be ensured. A plunger replacing the otherwise necessary mold closure necessitates, however, a core extension separate from the mold core, which must likewise have an axial web continuing the flight, so that the mold cavity is tightly sealed with respect to the sintering powder after the core extension has been set against the mold core. In this connection it should also be noted that there must first be created a corresponding mold cavity between the core extension and the mantle, in that after filling in the sintering powder the mold core is shifted with respect to the mantle by means of the attached core extension. When the plunger associated to the mold core is held against also being shifted, a precompaction of the sintering powder is achieved.

For removing the pressed molded body from the mold, the mold core with the associated plunger can form an ejector for the molded body, which must then be lifted from the mold core in a screw movement. This additional rotary movement is, however, only required for removing the molded body from the mold, but not for pressing the molded body, and can therefore simply be performed by a gripper independent of the form tool and the molding press.

BRIEF DESCRIPTION OF THE DRAWING

In the drawing, the subject-matter of the invention is represented by way of example, wherein:

FIG. 1 shows an inventive form tool in a simplified axial section in the filling position, FIG. 2 shows a top view of the mold core and the mantle, FIG. 3 shows a representation of the form tool corresponding to FIG. 1 in the pressing position, and FIG. 4 shows the form tool in the ejecting position.

DESCRIPTION OF THE PREFERRED EMBODIMENT

The form tool in accordance with the illustrated embodiment comprises a mantle 1 with a circular cylindrical mold core 2, which forms a flight 3 protruding against the mantle 1 and verging into an axial web 4, whose cross-section corresponds to the connecting cross-section of the flight 3 normal to the axis. The mold cavity 5 formed between the mantle 1 and the mold core 2 is sealed towards the bottom by a ring-shaped plunger 6 movably guided on the mold core 2.

On the side of the mantle 1 opposite the plunger 6 a further ring-shaped plunger 7 is provided, in which a core extension 8 is guided so as to be axially movable. This core extension 8 can be set against the mold core 2 and comprises an axial web 9 continuing the flight 3 in the connecting position, which web 9 like the web 4 of the mold core 2 engages in a corresponding groove of the associated plunger 7.

In the filling position shown in FIG. 1, the mold core 2 lies flush with the mantle 1 on its end face, so that with the core extension 8 lifted off, the sintering powder 10 from which the molded body, for instance a cam, is going to be pressed can be filled into the mold cavity 5 sealed towards the bottom by the plunger 6. For pressing the molded body, the core extension 8 is first set against the mold core 2 and then pushed into the mantle 1 by entraining the mold core 2, namely against a corresponding acting force of the mold core 2. Since the lower plunger 6 is fixed with respect to the mantle 1, there is created a space for the engagement of the upper plunger 7, with respect to which the core extension 8 can be shifted. After the core displacement, the sintering powder 10, which in the case of this core displacement undergoes a precompaction in the vicinity of the flight 3, can thus uniformly be compacted from both end faces to form a compact 11 by means of the plungers 6 and 7 advanced against each other into the mold cavity 5, until the plungers reach the flight 3 at the end of the axial webs 4 and 9, respectively, as this is shown in FIG. 3. Since the flight 3 prevents a further axial movement of the plungers 6, 7, the axial length of the flight 3 must correspond to the axial length of the molded body. The finished compact 11 is then ejected from the mantle 1 by means of the mold core 2 and the plunger 6, so that with the core extension 8 lifted off the compact 11 becomes accessible to a gripper, by means of which the compact 11 can be removed from the mold core 2 by a screw adjustment.

We claim:

1. A form tool for compression forming a molded body having a circular cylindrical through hole with at least one helical groove from a sintering powder, comprising a mantle with an inserted mold core, having at least one flight protruding against the mantle for forming the groove of the molded body, and comprising a first ring-shaped plunger engaging in a mold cavity defined by the mantle and the mold core, wherein an axial length of the flight of the mold core corresponds to the axial length of the molded body, and the mold core has a first axial web continuing the flight, said first web engaging in an adapted axial groove of the first ring-shaped plunger.

2. The form tool as claimed in claim 1, wherein the tool further comprises a second ring-shaped plunger opposite the first plunger and engaging in the mold cavity, said second plunger being movably guided with respect to a core extension which is axially set against the mold core, said core extension having a second axial web engaging into a second axial groove formed in the second plunger and continuing the flight of the mold core, and wherein the core extension is movable with respect to the first plunger by entraining the mold core.

3. A form tool as claimed in claim 2, wherein the mold core together with the first plunger forms an ejector for the pressed molded body.

* * * * *